Sept. 25, 1962 J. CUNETTA 3,055,502
DIGESTER WITH REMOVABLE GAS LIFTS
Filed July 30, 1958 2 Sheets-Sheet 1
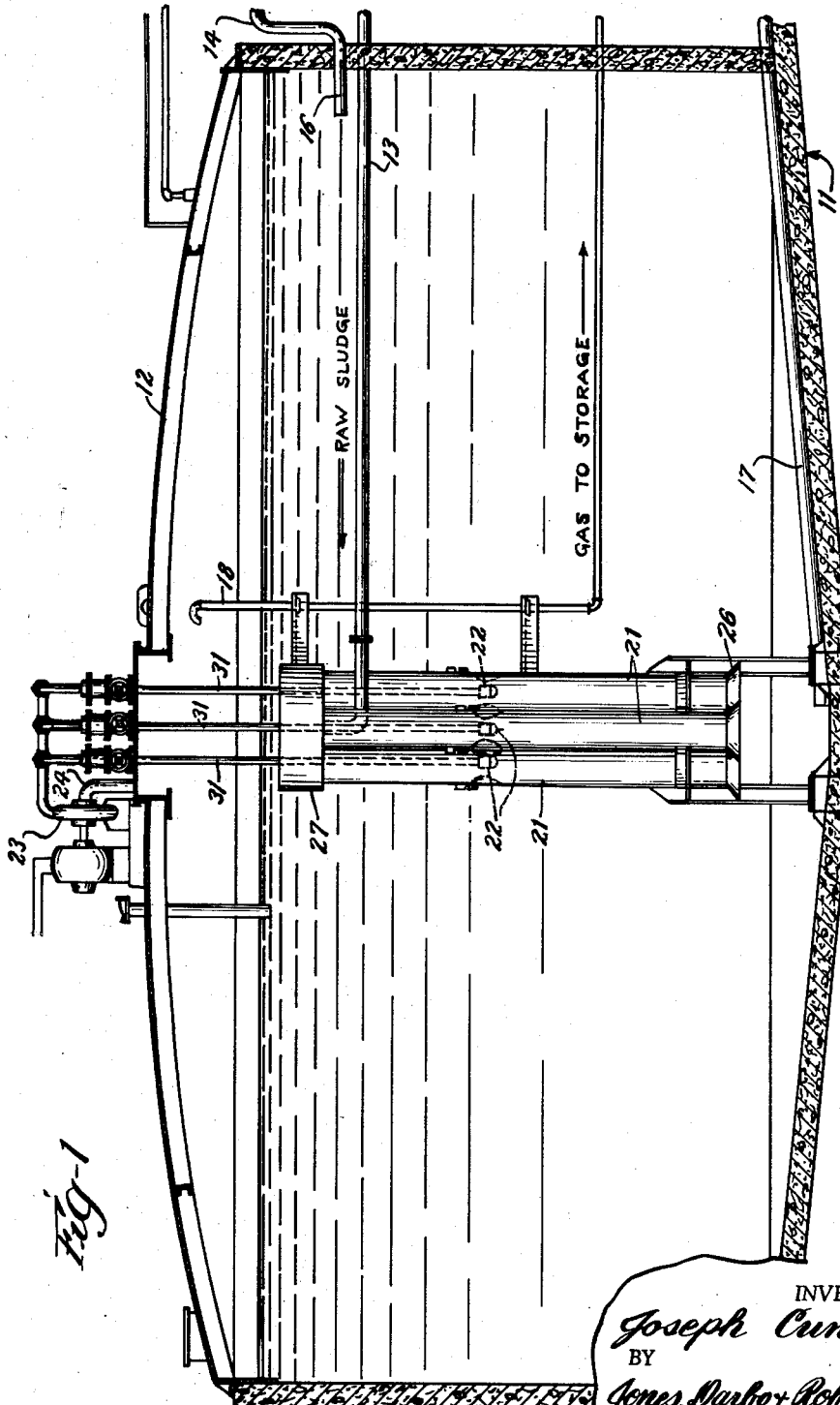
INVENTOR.
Joseph Cunetta
BY
Jones, Darbo + Robertson
Attys.

Sept. 25, 1962 J. CUNETTA 3,055,502
DIGESTER WITH REMOVABLE GAS LIFTS
Filed July 30, 1958 2 Sheets-Sheet 2
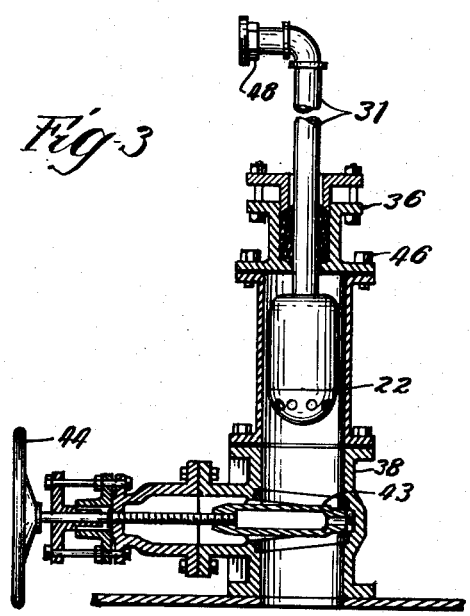
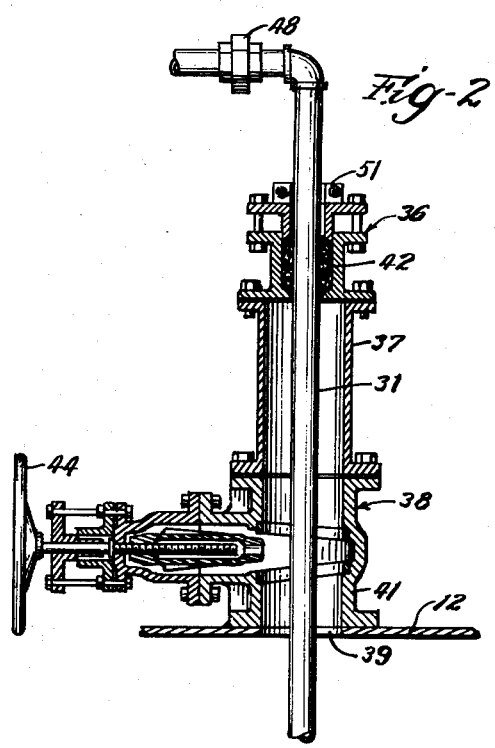
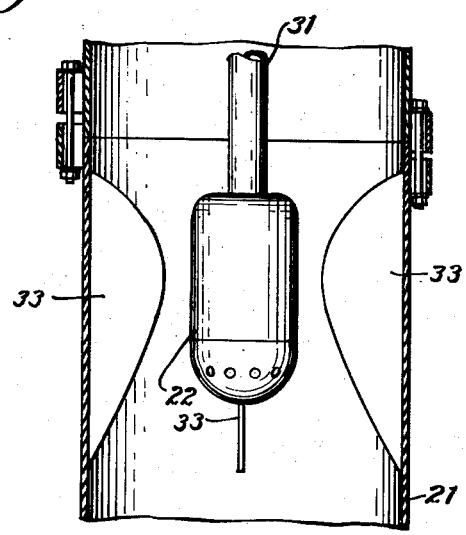
INVENTOR.
Joseph Cunetta
BY
Jones, Darbo & Robertson
Attys.

United States Patent Office 3,055,502
Patented Sept. 25, 1962

3,055,502
DIGESTER WITH REMOVABLE GAS LIFTS
Joseph Cunetta, 164 Parkside Ave., Brooklyn 26, N.Y.
Filed July 30, 1958, Ser. No. 752,019
4 Claims. (Cl. 210—197)

In the digestion of sewage sludge, it is beneficial to achieve rapid and thorough intermixing of the contents of the huge digester tank. The best way to accomplish this is with the gas lift principle. The most efficient way to use the gas lift principle is to provide updraft tubes into which gas is liberated. The updraft tubes communicate with the main body of sludge in the bottom of the tank and just a little below the liquid level in the tank and are located generally at the center of the tank. As a result, the rapidly upflowing sludge spreads out laterally from the updraft tubes to the walls of the tank. As sludge is drawn into the tube at the bottom of the tank near the center, a continuous rolling circulation is set up. Preferably raw sludge is fed directly to the updraft tubes so that it is intimately mixed and seeded with digested sludge as it enters the tank.

Although the use of gaslift in sludge digestion tanks has been known, and even the use of gaslift of the draft tube principle has been published, one great difficulty has remained. The gas liberating devices occasionally need servicing, and this has presented a severe problem. During digestion, methane gas is produced and tanks are made gas tight so as to recover this escaping gas and the excess of the gas has been used in burners for heating boilers, or stored. Opening the tank to service the gas liberating device has necessitated loss of the gas entrapped prior to opening the tank and that which would have been recovered during the entire servicing operation. Furthermore, it has often been necessary for a man to enter the tank, or at least be exposed to the voluminous escaping gas, or a possibly combustible mixture thereof with outside air. It is a very disagreeable task at best and is likely to be dangerous.

According to the present invention, a sludge-digestion tank is provided with updraft tubes wherein the gas liberating devices can be withdrawn from the tank for servicing without interrupting the recovery of the methane gas. To make this possible, the gas liberating devices are mounted at the bottom of supply pipes which extend down through the top of the updraft tube, so that they may run straight down from their point of passage through the roof into the tube. According to the present invention, gas-lock means are provided in conjunction with the passage of the supply pipes through the roof so that they may be withdrawn without opening the main gas storage space to the atmosphere.

According to the illustrated form of the invention, the gas-lock comprises a gate valve, with a packing device surrounding the supply pipe above the valve, and an intervening chamber between the packing device and the valve. During normal operation the gate valve is wide open with the gas supply pipe extending down through it. When it is desired to service the gas liberation device, it is drawn upwardly into the chamber, the supply pipe sliding through the packing, and the gate valve is closed below it. The chamber in which it is located, or the packing-containing head thereof, can then be removed and the gas liberating device is exposed for servicing.

Additional objects and advantages of the invention will be apparent from the following description and from the drawings.

Designation of Figures

FIGURE 1 is a vertical cross sectional view partly diagrammatic of a digester tank with the present invention incorporated therein.

FIGURE 2 is a vertical cross sectional view through one of the gas-lock portions of the structure shown in FIG. 1, with the supply pipe extending therethrough.

FIGURE 3 is a view corresponding to FIG. 2 but showing the gas supply pipe together with its gas liberating head drawn upwardly, and the valve closed below it.

FIGURE 4 is a vertical sectional view on a larger scale showing the air liberation head in its normal position with a central area defined by vanes extending from the walls of the updraft tube.

General Description

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid towards this purpose, as it is these that meet the requirement of pointing out the parts, improvements, or combinations in which the inventive concepts are found.

FIG. 1 illustrates a sludge digestion tank in which this invention has been incorporated, but in many respects this tank may be conventional. Thus there may be a conventional tank 11 of concrete bottom and side walls closed and sealed by a roof 12. Raw sludge may be fed to the tank through a pipe 13. The liquid level in the tank may be determined by an overflow pipe 14 with its opening 16 in the tank at a level or otherwise so constructed as to draw off mainly effluent, with as little solids as possible. As the solids in the sludge become digested they become heavier and settle to the floor of the tank from which they may be withdrawn by a digested sludge draw-off pipe 17. Methane gas is liberated from the sludge during digestion and this gathers under the roof 12 where it may be withdrawn by a pipe 18 leading to storage tanks from which the gas is drawn for use.

Gas Lift Circulation

It is highly desirable to produce thorough intermixing of the contents of the digestion tank 11. This is most efficiently accomplished by gaslift operation. Thus, it has been proposed heretofore to provide a gaslift tube 21 into which gas is liberated, in this instance through a liberating head 22, at a sufficient depth below the liquid level in the tank so that the rising gas will cause an upflow of the sludge liquor within the updraft tube 21, and this in turn will set up a circulating roll affecting the entire contents of the tank. The rising liquor spreads out over the top of the contents of the tank, and as it spreads out more and more of the gas bubbles in it escape so that it becomes more dense. This denser sludge occupying the main area of the tank tends to flow into the updraft tube 21 to replace the liquor and gas mixture flowing upwardly in the tube 21. While this circulation continues, any sludge overflowing through pipe 14 or drawn off through pipe 17 would be an unsettled sludge such as found throughout the tank. In order to draw effluent and settled sludge respectively from these two pipes 14 and 17, the gaslift action may be shut down or discontinued for a sufficient time for settling to occur. If it is preferred to continue the gas-lift action constantly, separate provision may be made for settling the sludge. For example the sludge drawn off through pipe 14 may be taken to a second tank in which settling occurs.

The gas liberated through liberation heads 22 is supplied by a blower or compressor 23 which preferably draws gas through an intake connection 24 from the gas recovery space below the roof 12. Inasmuch as the gas withdrawn is immediately returned to the tank, this use of the gas for the gaslift action does not detract from the amount of gas which may be withdrawn through pipe 18.

Gaslift Construction

In order to cause an adequate circulating roll affecting the entire huge digester tank 11, great quantities of the slurry must be raised in the gaslift assembly. Although this could be accomplished with a single large sized gaslift tube and a sufficiently scattered gas liberation, it is preferred that a plurality of gaslift tubes be provided. In the illustrated form, three gaslift tubes 21 have been provided. Although they have separate intakes 26, each flared, they preferably all deliver to a common discharge pan 27.

The rising sludge from the three updraft tubes 21 will flow out over the top of the discharge pan 27 in all directions. The top of the discharge pan 27 is preferably just enough below the surface level of the sludge liquor in tank 11 so that the rising sludge can flow over it without materially raising the local surface level. Thus in effect the discharge pan 27 is a continuation of the updraft tubes so that the light density, bubble-filled sludge is not robbed of its lifting force by admixture with the external sludge of greater density until the light sludge has been carried as far upwardly as is possible without increasing the lift above the surface level.

An advantage of a common discharge pan or head 27 for the plurality of updraft tubes 21 is that even if some partial obstruction or clogging should cause inequality of flow between the tubes, their total flow will nevertheless be evenly spread out in all directions.

Another advantage of providing a common discharge pan for the plurality of updraft tubes 21 is that the raw sludge line 13 may be carried to this common discharge head 27. The agitation caused by the rising bubbles within the head, and the further turbulence caused by the changing direction of the sludge from the upward direction to the horizontal direction in an area confined by the upper edge of pan 27, will cause very thorough mixing of the raw sludge with the digester sludge immediately upon the introduction of the raw sludge. Preferably the outlet of the raw sludge line 13 is equidistant from all of the updraft tubes 21, or virtually directed into the path of each equally, so that the raw sludge is mixed fairly uniformly with all parts of the uprising digester sludge.

Those skilled in the art will recognize that the raw sludge, even if it has been subjected to some preliminary concentration, will be quite liquid in nature, probably in the neighborhood of 97% water, so that it will intermix very easily with the upflowing sludge which is also quite liquid.

The intermixing of the raw sludge with the digester sludge at the outset has the effect of considerably speeding up the digestion of the sludge by seeding the raw sludge.

Removability of Gas Liberating Units

Each of the gas liberating heads is carried by a supply pipe 31. Each of the supply pipes 31 extends down through the open upper end of its updraft tube 21, and carries the liberating head 22 at its bottom. The liberating heads 22 are retained at or near the center of the respective tubes 21 by three or more vanes 33 seen best in FIG. 4. These vanes are preferably given a non-clogging shape so as not to catch any strand of cloth or other material which may be in the sludge. They are illustrated as carried by the walls of the updraft tube 21 and as being spaced from the gas liberation head 22 so that such strands can pass between the two. The spacing does not need to be nearly as great as that shown, however.

According to the present invention, the air liberating unit comprising supply pipes 31, each with its head 22, may be removed without permitting the escape of any substantial quantity of gas from the tank. The manner in which this is accomplished is best explained with reference to FIGS. 2 and 3.

During normal operation of the digester, the gas supply tube 31 extends down through a packing assembly 36, through a gaslock chamber 37, and through a gate valve assembly 38, all of which are mounted on the cover 12 in alignment with the aperture 39 through the cover. The gate valve housing 41 may be sealed to cover 12 by welding, or by bolting with a gasket, and the successively higher parts are also sealed to one another. Packing 42 in packing unit 37 is compressed around supply pipe 31 so as to prevent the escape of gas around the pipe.

When it is desired to remove one of the gas supply units, the supply pipe 31 is slid upwardly through the packing 42 until the head 22 is high enough to close the gate 43 of gate valve assembly 38 below the head 22. Supply pipe 31 may be a single length of smooth walled stainless steel tubing.

When the gas supply unit has thus been raised, handle 44 will be turned to slide valve gate 43 into the closed position as seen in FIG. 3. Thereafter the structure above it may be opened at any point. Thus by removing bolts 46 (or a quick clamping device used instead), packing assembly 36 can be raised to withdraw head 22 from gas lock 37 and expose head 22 completely for servicing such as inspection and cleaning or replacement if needed.

It will be understood of course that unless a sufficient length of flexible hose is provided, supply pipe 31 will be loosened from the supply pipe leading to pump 23 as by uncoupling a union joint 48.

When the servicing has been completed, the parts may be restored to the positions shown in FIG. 3. Thereupon the handle 44 may be turned to withdraw the gate 43, the pipe 31 slid downwardly to the proper position for operation and connected to its source of compressed gas supply. If inspection should show any leak through packing 42, it may be simply compressed a little farther in the usual manner.

Other gas lock arrangements between the roof 12 and the supply pipe 31 which permit removal of supply pipe 31 without substantial loss of gas may be substituted. For example, in pursuance of my disclosure, licensees hereunder have provided a tube surrounding supply pipe 31 and extending from the roof 12 down ten to fifteen inches or so below the surface of the liquid. The gas pressure under roof 12 is too low to blow the water up in the tube either objectionably or enough to let gas escape. The tube can be as large as desired and hence it becomes practical to attach the fins 33 to the head 22 on pipe 31 and remove them with the gas liberation unit. A packing or other seal is required between the tube and the pipe 31 but merely so that the liberated gas which happens to rise within the tube will not escape, and this packing can simply be removed and left off during servicing. It is assumed that that improvement will be the subject of a separate application.

Although a fixed roof has been shown, roofs which rise and fall can be used with this invention, these roofs already being known.

At present it is believed possible to use a single large diameter updraft tube instead of the cluster of smaller ones. Past developments with large diameter tubes suggest the desirability of tests before too firm a committal to this variation. With a large tube a plurality of gas liberating heads 22 should still be used. For example, with a tube 30" in diameter, three gas heads are deemed appropriate. It is important that each gas liberating head be carried at the end of a vertical supply pipe so that there will be a minimum chance for clogging by rags or other strands. A single supply pipe with a cross pipe to offset heads would tend to become well loaded with strands straddling it.

It will be observed that the discharge heads 22 are not located near the bottoms of the updraft tubes 21. Such a tube location has been considered necessary for efficiency, but that has not proved to be so in the present instance where the head against which the gaslift device is working is virtually zero. Even a higher location than that illustrated would have a submergence ratio of higher than the seven to one commonly deemed necessary. The higher location has some advantages. Although more gas must be pumped, it is pumped at a lower pressure. A less expensive type of pump or blower may be used and a given blower operates at greater efficiency. The overall effect appears to be a reduction of power requirements.

The gas liberation heads 22 are preferably somewhat streamlined bodies which liberate gas through a plurality of orifices of substantial size (drilled holes being suitable). These have been found to give so little trouble that most instances of removing the gas liberation units for servicing will turn out to be merely for inspection and return.

To facilitate returning the supply pipes 31 to their normal positions, split collars 51 may be provided which clamp on pipes 31 and rest on packing assemblies 36.

I claim:

1. A digester comprising a substantially gas tight tank having a roof including a raised gas collecting hood, said tank being adapted to retain a deep body of liquor therein, means for supplying to the tank liquid in the form of waterborne solids from a waste treatment plant, means for inducing a toroidal movement of the tank contents, with movement from a central zone to the side walls of the tank including gaslift tube means centrally disposed within the tank, occupying only a small fraction of the tank transverse dimension, open at the bottom and the top to the main body of the tank and means for liberating gas in the tube means a substantial distance below the top thereof to spread throughout the cross-sectional area of the tube means and cause flow upwardly in the tube by gaslift effect, including a plurality of supply pipes extending down through the open top end of the updraft tube means, a pump connected to draw gas from said hood and deliver it to said supply pipes, and a single gas distribution head of orifice type carried by the lower end of each supply pipe at least as high as approximately the mid-level of the tank, each supply pipe extending substantially straight upwardly through the roof of the tank and being removable therethrough; and gas seal means between the tank roof and each pipe constructed to provide an internal diameter permitting withdrawal of the pipe and its distribution head therethrough when desired and for substantially preventing the escape of gas from below the roof in connection with the removal of one of the supply pipes through the roof, said updraft tube means extending substantially below the gas distribution heads, at substantially the same internal diameter as at the heads.

2. A digester comprising a substantially gas tight tank having a roof including a raised gas collecting hood, said tank being adapted to retain a deep body of liquor therein, means for supplying to the tank liquid in the form of waterborne solids from a waste treatment plant, means for inducing a toroidal movement of the tank contents, with movement from a central zone to the side walls of the tank including gaslift tube means centrally disposed within the tank, occupying only a small fraction of the tank transverse dimension, open at the bottom and substantially fully open at the top to the main body of tank below the liquid level thereof and means for liberating gas in the tube means a substantial distance below the top thereof to cause flow upwardly in the tube by gaslift effect, including a supply pipe extending down through the open top end of the updraft tube means, a pump connected to draw gas from said hood and deliver it to said supply pipe, and a single gas distribution head of orifice type carried by the lower end of the supply pipe at least as high as approximately the mid-level of the tank, and the head and supply pipe being entirely and immediately surrounded within the updraft tube means by flow area to minimize the catching of strands thereon, the updraft tube means extending to near the bottom of the tank and being of as large cross section throughout its length as just above its bottom for providing heavy flow therethrough to stir the entire digester contents.

3. A digester comprising a substantially gas tight tank having a roof including a raised gas collecting hood having a cover, said tank being adapted to retain a deep body of liquor therein, means for supplying to the tank liquid in the form of waterborne solids from a waste treatment plant, means for inducing a toroidal movement of the tank contents with movement from a central zone to the side walls of the tank including gaslift tube means centrally disposed within the tank, occupying only a small fraction of the tank transverse dimension, open at the bottom and the top to the main body of the tank with substantially unobstructed flow area beyond each end for lateral flow, and means for liberating gas in the tube means a substantial distance below the top thereof at points dispersed evenly throughout the cross-sectional area of the tube means and cause flow upwardly in the tube by gaslift effect, including a plurality of supply pipes extending down through the open top end of the gaslift tube means, a pump connected to draw gas from said hood and deliver it to said supply pipes, and a single gas distribution head of orifice type carried by the lower end of each supply pipe at least as high as approximately the mid-level of the tank, each supply pipe extending substantially straight upwardly through the cover and being removable therethrough; and gas seal means between the cover and each pipe constructed to provide an internal diameter permitting withdrawal of the pipe and its distribution head therethrough when desired and for substantially preventing the escape of gas from below the roof in connection with the removal of one of the supply pipes through the roof, the head and supply pipe being entirely and immediately surrounded within the updraft tube means by flow area to minimize the catching of strands thereon, the updraft tube means extending to near the bottom of the tank and being of as large cross section throughout its length as just above its bottom for providing heavy flow therethrough to stir the entire digester contents.

4. A gas-lift stirring device for huge digesters including a gas dome cover for the digester roof, updraft tube means lying entirely within a space subtended by the cover, said tube means being open at both ends and spaced remotely from the cover to be below the surface level of the digester contents and provide a substantially unobstructed area for outward flow in all directions, a pump having its intake connected through the cover for drawing gas from the dome, and means for connecting the discharge side of the pump to liberate gas in the updraft tube means at an intermediate level thereof including a plurality of gas supply pipes extending into the updraft tube means through the open upper end thereof, and a single gas distribution head of orifice type carried by the lower end of each supply pipe and surrounded by flow area within the updraft tube means, each supply pipe extending substantially straight upwardly through the cover and being removable therethrough; and gas seal means between the cover and each pipe constructed to provide an internal diameter permitting withdrawal of the pipe and its distribution head therethrough when desired and for substantially preventing the escape of gas from below the roof in connection with the removal of one of the supply pipes through the roof.

References Cited in the file of this patent

UNITED STATES PATENTS

| | | |
|---|---|---|
| 243,769 | Fox | July 5, 1881 |
| 642,460 | Kersten | Jan. 30, 1900 |

(Other references on following page)

UNITED STATES PATENTS

| | | |
|---|---|---|
| 994,679 | Hills | June 6, 1911 |
| 1,310,051 | Blomfield | July 15, 1919 |
| 1,819,058 | Arnold | Aug. 18, 1931 |
| 2,246,224 | Streander | June 17, 1941 |
| 2,538,412 | Cecil et al. | Jan. 16, 1951 |
| 2,629,689 | Green et al. | Feb. 24, 1953 |
| 2,638,444 | Kappe | May 12, 1953 |
| 2,640,027 | McNamee et al. | May 26, 1953 |
| 2,667,341 | Busfield | Jan. 26, 1954 |
| 2,719,032 | Schnur | Sept. 27, 1955 |

FOREIGN PATENTS

| | | |
|---|---|---|
| 441,851 | Germany | Mar. 16, 1927 |